(12) United States Patent
Tal et al.

(10) Patent No.: US 6,778,534 B1
(45) Date of Patent: Aug. 17, 2004

(54) HIGH-PERFORMANCE NETWORK PROCESSOR

(75) Inventors: Alex Tal, Hadera (IL); Itzchak Gabbay, Ramot Itzchak (IL); Dennis Rivkin, Migdal Haemek (IL); Sharon Kaplan, Hoshava (IL); Shifra Rachamim, Kefar Tavor (IL); Ziv Horovitz, Moshav Dor (IL); Yohay Shefi, Nofit (IL); Gllad Frumkin, Haifa (IL)

(73) Assignee: E. Z. Chip Technologies Ltd., Yokneam Illit (IL)

( * ) Notice: Subject to any disclaimer, the term of this patent is extended or adjusted under 35 U.S.C. 154(b) by 825 days.

(21) Appl. No.: 09/609,221

(22) Filed: Jun. 30, 2000

(51) Int. Cl.$^7$ .............................................. H04L 12/56
(52) U.S. Cl. ........................ 370/392; 370/474; 709/238; 716/12
(58) Field of Search ................................ 370/349, 389, 370/392, 471, 474; 709/201, 236, 238, 249, 228, 242; 707/1, 3, 7; 716/2, 4, 12, 13, 14

(56) References Cited

U.S. PATENT DOCUMENTS

| | | | |
|---|---|---|---|
| 4,961,137 A | | 10/1990 | Augusteijn et al. |
| 5,121,495 A | | 6/1992 | Nemes |
| 5,367,672 A | | 11/1994 | Takagi |
| 5,511,190 A | | 4/1996 | Sharma et al. |
| 5,572,512 A | * | 11/1996 | Cutler et al. ................. 370/248 |
| 5,692,177 A | | 11/1997 | Miller |
| 5,724,351 A | | 3/1998 | Chao et al. |
| 5,742,806 A | | 4/1998 | Reiner et al. |
| 5,802,357 A | | 9/1998 | Li et al. |
| 5,860,018 A | | 1/1999 | Panwar |
| 5,864,842 A | | 1/1999 | Pederson et al. |
| 5,870,747 A | | 2/1999 | Sundaresan |
| 5,873,074 A | | 2/1999 | Kashyap et al. |
| 5,931,938 A | | 8/1999 | Drogichen et al. |
| 5,946,679 A | * | 8/1999 | Ahuja et al. ................... 707/3 |
| 6,028,846 A | | 2/2000 | Cain |
| 6,157,955 A | * | 12/2000 | Narad et al. ................. 709/228 |
| 6,188,689 B1 | * | 2/2001 | Katsube et al. ............. 370/389 |
| 6,404,752 B1 | * | 6/2002 | Allen et al. ................. 370/335 |
| 6,628,653 B1 | * | 9/2003 | Salim ......................... 370/389 |

OTHER PUBLICATIONS

Aaron Brown et al., 'An IRAM–based Architecture for a Single–Chip ATM Switch', TR–07–97, Center for Research in Computing Technology, Harvard University, Cambridge, Massachusetts, pp. 1–32.*

* cited by examiner

Primary Examiner—Dang Ton
Assistant Examiner—Tri H. Phan
(74) Attorney, Agent, or Firm—Mark M. Friedman

(57) ABSTRACT

A high-speed system for processing a packet and routing the packet to a packet destination port, the system comprising: (a) a memory block for storing tabulated entries, (b) a parsing subsystem containing at least one microcode machine for parsing the packet, thereby obtaining at least one search key, (c) a searching subsystem containing at least one microcode machine for searching for a match between said at least one search key and said tabulated entries, (d) a resolution subsystem containing at least one microcode machine for resolving the packet destination port, and (e) a modification subsystem containing at least one microcode machine for making requisite modifications to the packet; wherein at least one of said microcode machines is a customized microcode machine.

27 Claims, 2 Drawing Sheets

PRIOR ART

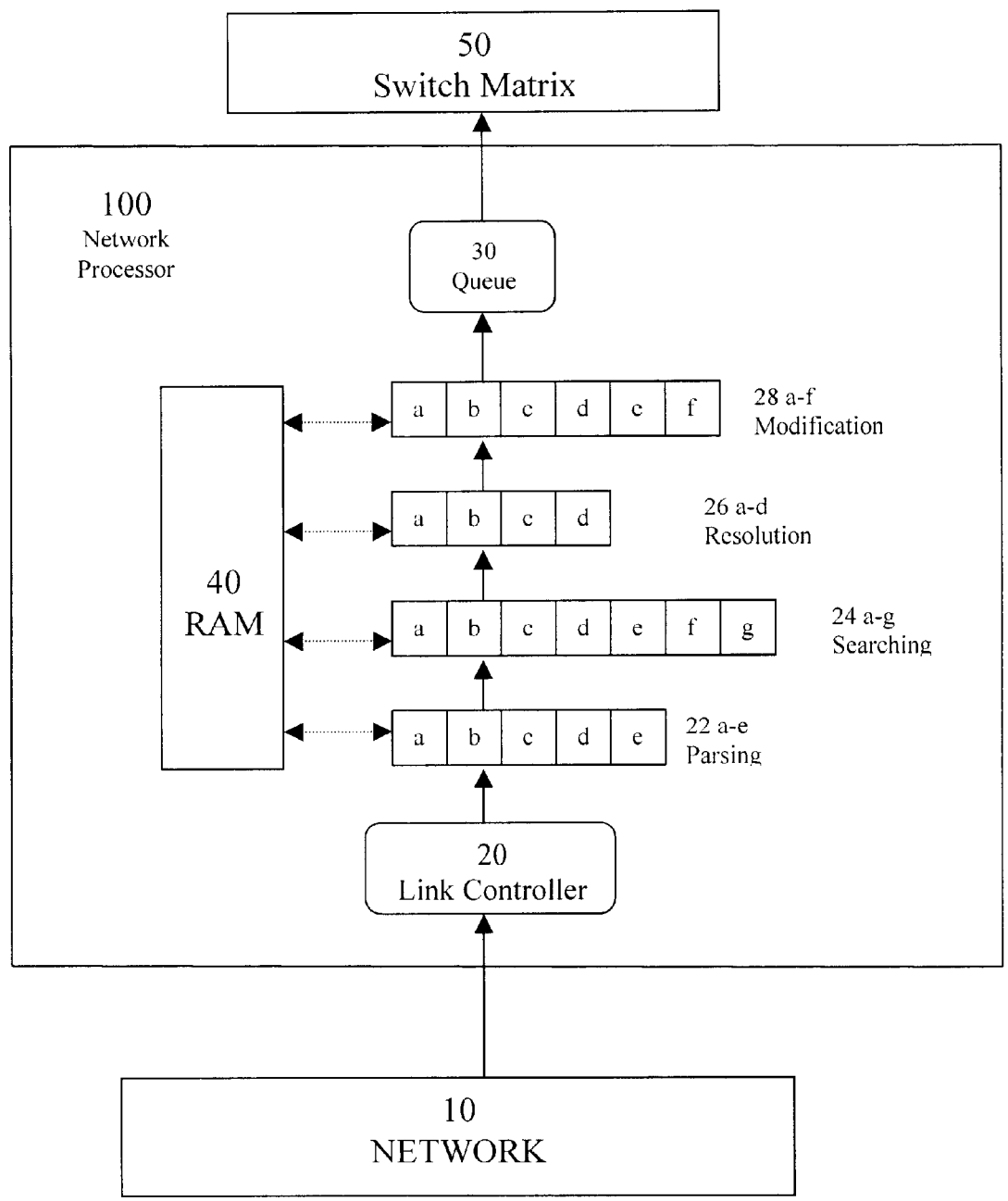

HIGH-PERFORMANCE NETWORK PROCESSOR

FIELD AND BACKGROUND OF THE INVENTION

The present invention relates to network processor designs and network processing architecture, and, in particular it concerns the design and utilization of programmable, task-customized processors and super-scalar architecture to provide improved processing performance.

The demand for intelligent, increasingly complex network processing at wire speed has led to the creation of network processors (also called communications processors). Programmable network processors provide system flexibility while delivering the high-performance hardware functions required to process packets at wire speed. Consequently network processors are expected to become the silicon core of the next generation of networking equipment.

The architecture of most known network processors is based on integration of multiple RISCs (Reduced Instruction Set Computer) processors into a silicon chip.

There are several known network processor designs based on the integration of multiple "off the shelf" RISC processors into a single chip. By definition, a RISC computer architecture reduces chip complexity by using simpler instructions than those of CISC (Complex Instruction Set Computer) computers.

In a RISC the microcode layer and associated overhead is eliminated. A RISC maintains a constant instruction size, dispenses with the indirect addressing mode and retains only those instructions that can be overlapped and made to execute in one machine cycle. Because there is no microcode conversion layer, a RISC machine executes instructions quickly. However, a RISC compiler has to generate routines using simple instructions. Performing complex tasks requires many commands, each of which normally takes a clock cycle.

There are several major drawbacks to RISC-based network processors, including the use of numerous commands, the time required to perform complex tasks, and an inability to modify the data path. Although RISC-based network processors, even with these deficiencies, are capable of attaining improved performance, the deficiencies do not allow most RISC-based network processors to deliver processing performance on more than a handful of Gigabit ports.

Although RISC processors are frequently deployed in parallel to produce high speeds, the architecture is still constrained by the RISC throughput. Perhaps more importantly, for a given chip size, there is a physical limit to the number of RISCs that can be incorporated without exceeding a practical silicon die size.

Because the wire speed on the Internet has increased by orders of magnitude over the last few years, there are increasing demands on network processing Systems to improve performance to match the wire speed, thereby averting bottle-necking and associated problems related thereto. However, the performance (speed) goal of these network processing systems approaches only 1–2 gigabits per second, well behind the wire speed of 10–40 gigabits per second that is already on the horizon.

One method of increasing processing speed is to enlarge the size of the chip. Much progress has been achieved in this direction over the past 30 years. It appears, however, that a further increase in chip size will be rather expensive, as the probability of obtaining a defect increases appreciably for chips having a characteristic length dimension exceeding 13 millimeters. Moreover a modest increase in the characteristic length dimension, e.g., from 13 millimeters to 16 millimeters, results in an area increase of only 50%, a far cry from the order-of-magnitude increase in performance that is required.

Another method of increasing processing speed is to increase the transistor/process density of the chip, i.e., the number of gates per unit area. Much progress has been achieved in this direction in the past, and it appears likely that progress will continue to be made in the foreseeable future. Historically, however, the number of gates per unit area has increased at a rate of about 50% per year, such that the requisite order-of-magnitude increase in performance appears to be many years away.

There is therefore a recognized need for, and it would be highly advantageous to have, a network processing system that provides significantly faster performance than existing network processing systems, and more particularly, a network processing system that provides significantly faster performance than existing network processing systems for a given chip size and transistor/process density.

SUMMARY OF THE INVENTION

The present invention is a system that utilizes task-customized processors to provide improved processing performance. These task-customized processors can be integrated in a super-scalar architecture to further enhance processing speed.

According to the teachings of the present invention there is provided a high-speed system for processing a packet and routing the packet to the requisite packet destination port comprised of: (a) a memory block for storing tabulated entries, and (b) at least one microcode machine, interacting with the memory block and accessing the tabulated entries, for processing and routing the packet, wherein at least one of the at least one microcode machine is a customized microcode machine.

According to yet another aspect of the present invention there is provided a high-speed system for processing a packet and routing the packet to a packet destination port, the system comprising: (a) a memory block for storing tabulated entries, (b) a parsing subsystem containing at least one microcode machine for parsing the packet, thereby obtaining at least one search key, (c) a searching subsystem containing at least one microcode machine for searching for a match between the at least one search key and the tabulated entries, (d) a resolution subsystem containing at least one microcode machine for resolving the packet destination port, and (e) a modification subsystem containing at least one microcode machine for making requisite modifications to the packet; wherein at least one of the microcode machines is a customized microcode machine.

According to yet another aspect of the present invention there is provided a system for processing a packet and routing the packet to a packet destination, the system comprising: (a) a memory block for storing tabulated entries, (b) a parsing subsystem containing at least one microcode machine configured for parsing the packet, thereby obtaining at least one search key, (c) a searching subsystem containing at least one microcode machine configured for searching for a match between the at least one search key and the tabulated entries, (d) a resolution subsystem containing at least one microcode machine configured for resolving the packet destination, and (e) a modification subsystem containing at least one microcode machine configured for making requisite modifications to the packet.

According to further features in the described preferred embodiments, the system has super-scalar architecture.

According to still further features in the described preferred embodiments, at least one of the customized microcode machines has a customized instruction set.

According to still further features in the described preferred embodiments, at least one of the customized microcode machines has a customized data path.

According to still further features in the described preferred embodiments, some or all of the memory block is embedded in a single chip along with the microcode machines.

According to still further features in the described preferred embodiments, the packets are processed at a rate of at least 8 gigabits per second.

According to still further features in the described preferred embodiments, the packets are processed at a rate of at least 16 gigabits per second.

According to still further features in the described preferred embodiments, the customized microcode machine is a parsing microcode machine.

According to still further features in the described preferred embodiments, the customized microcode machine is a searching microcode machine.

According to still further features in the described preferred embodiments, the customized microcode machine is a resolution microcode machine.

According to still further features in the described preferred embodiments, the customized microcode machine is a modification microcode machine.

According to still further features in the described preferred embodiments, the parsing subsystem, the searching subsystem, the resolution subsystem, and the modification subsystem are embedded in a single chip.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2 is a schematic flow diagram of a network processor utilizing custom-designed microcode machines, according to the present invention.

DESCRIPTION OF THE PREFERRED EMBODIMENTS

Figure 1:
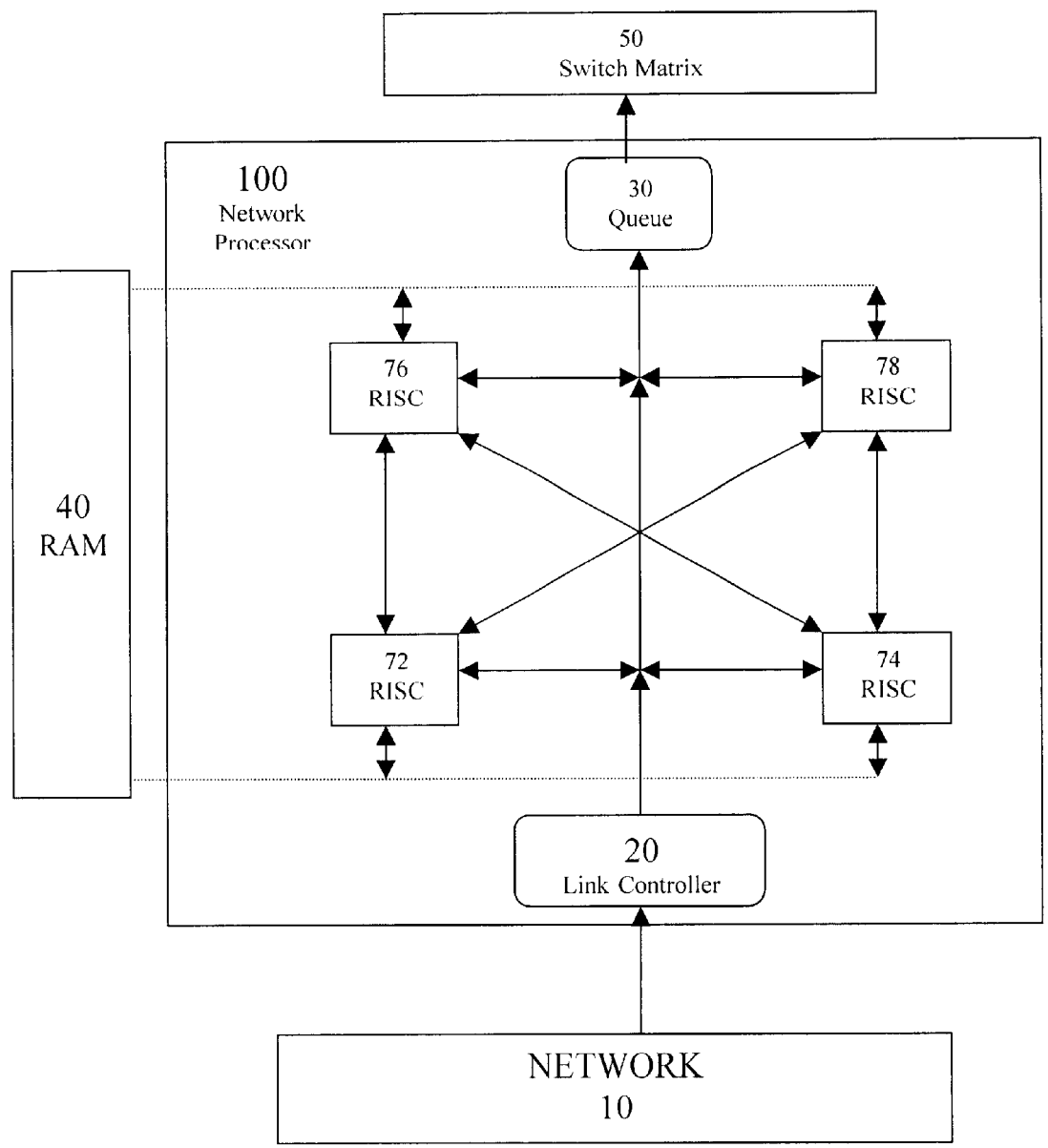
FIG. 1 is a schematic flow diagram of a network processor utilizing RISC processors, according to the prior art.

The present invention is a system that utilizes task-customized processors to provide improved processing performance. These task-customized processors can be integrated in a super-scalar architecture to further enhance processing speed.

The principles and operation of task-customized processors according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

A new type of network processors based on task-customized processors (rather than generic RISC processors) has been developed by the inventors in order to provide the processing performance required for the next generation of networking products. In task-customized processing, each processor core is tailored to perform a specific networking task. These fast and efficient cores are then integrated in a super-scalar architecture that is designed and optimized tool packet-processing tasks. Consequently, many of the limitations of RISC-based architecture are overcome.

As compared with generic processors, task-customized processors are much more compact. Moreover, the instruction set is designed to perform the functions of each individual processor, such that the instruction set is specific relative to RISC processors of the prior art. Typically, as few as $\frac{1}{10}$ the number of commands used by a RISC-based processor are required by a task-customized processor to accomplish the same task.

In addition to the optimization of the instruction set the data path within each microcode machine is also tailored to the particular networking task of the microcode machine. Hence, each network processor contains two or more types of microcode machines, each type having a specialized data path (architecture) and a specialized instruction set. Consequently, the packet processing task at each stage is achieved faster using a microcode machine that is more compact (i.e. requires fewer gates) and takes up less silicon real-estate on the chip.

The customizing or configuring of processors to perform specific tasks is well known in applications outside of network processing. For example, significant improvement in performance has been obtained by task customizing and optimization. Digital Signal Processors (DSPs) are a prime example of the enhancement achieved through such task optimization. DSPs can be viewed as conventional RISC processors with special hardware and instructions for efficiently processing digital signal data. DSPs offer improved performance as compared to a RISC for DSP algorithms that involve fast multiplication of matrixes.

As used herein in the specification and in the claims section that follows, the terms "processor core", processor, and "microcode machine" are used interchangeably to refer to a programmable processor or computing machine. Examples of such devices include CISC (Complex Instruction-Set Computer) and RISC (Reduced Instruction-Set Computer).

As used herein in the specification and in the claims section that follows, the term "network processor" refers to a plurality of microcode machines that are integrated to perform various networking tasks. Typically, a network processor classifies, modifies and forwards an information packet.

As used herein in the specification and in the claims section that follows, the term "superscalar network processor" refers to a network processor wherein packet processing tasks are performed by microcode machines working in parallel. A superscalar network processor typically has a pipeline architecture in addition to the parallel-processing architecture.

As used herein in the specification and in the claims section that follows, the term "pipeline" refers to computing assembly lines, used for instruction processing, or more generally, for performing complex operations, in which the processing is overlapped.

As used herein in the specification and in the claims section that follows, the terms "customized microcode machine" and "TCP (task-customized processor)" and the like refer to a processor core that has been designed and/or configured to achieve a specific, well-defined task. Examples of such tasks include, but are not limited to, parsing, searching, resolving and modifying. A customized microcode machine can have a data path that is tailored to perform a particular task ("customized data path"). Given a particular task, a customized microcode machine can also be equipped with a specially-formulated instruction set ("customized instruction set") that is more compact and more powerful than generic processors such as RISCs.

Referring now to the drawings, FIG. 1 is a schematic flow diagram of a network processor 100 utilizing RISC processors, according to the prior art. From the network 10, information packets are transferred to one or more generic RISCs 72, 74, 76, 78 via the link controller 20. The system architecture is open, such that each RISC 72, 74, 76, 78 can execute one or more of the packet processing tasks, and each RISC 72, 74, 76, 78 can transfer some or all of the remaining tasks to another one or more RISCs.

In packet processing, various tasks are performed, some of which require accessing a random access memory (RAM) 40. Each RISC 72, 74, 76, 78 is capable of reading from or writing to the RAM 40. As there is insufficient space on the network processor 100 (i.e., on the chip) to accommodate the RAM 40 (in most cases), the RAM 40 is situated outside the network processor 100, on a different chip.

FIG. 2 is a schematic flow diagram of a network processor 100 utilizing custom-designed microcode machines 22,24, 26,28, according to the present invention. From the network 10, information packets are transferred to the parsing stage 22 via the link controller 20. In the parsing stage 22, the contents of the packet header(s) and fields are analyzed and extracted. The parsing stage 22 is capable of handling all seven OSI packet layers including fields with dynamic offsets and length.

The searching stage 24 receives search keys, which are the fields extracted by the parse stage. Subsequently the searching stage 24 performs the various table look-ups required for layer 2 switching, layer 3 routing, layer 4 session switching, and Layers 5–7 content switching and policy enforcement.

All packet processing stages can access the random access memory (RAM) 40, as necessary.

After the various search and match operations have been completed, the searching stage 24 conveys search results to the resolution stage 26. The resolution stage 26 is the decision point for packet handling. In the resolution stage 26, the packet is assigned to the appropriate output port via the queue 30 and the switch matrix 50, and any quality of service (QoS) requirements are attended. Packet history information may be stored, and content changes may be decided. In multicast applications, the packet is forwarded to multiple ports. In a preferred embodiment of the present invention, the resolution stage 26 also gathers traffic accounting information on a per flow basis for network usage analysis and billing.

The packet is then conveyed to the modification stage 28. When necessary, the packet is modified (e.g. certain fields within the packet are overwritten, removed or inserted).

For increased processing power, the task-customized cores are employed in a superscalar architecture. The packet processing tasks are pipelined, passing packets from the parsing subsystem 22 to the searching subsystem 24 to the resolving subsystem 26 to the modifying subsystem 28. Each subsystem typically consists of multiple processors, enabling the processing of multiple packets simultaneously at each stage, or enabling a given packet to be simultaneously processed using multiple processors.

The number of processors at each stage is dependent on the complexity of the processing task at hand. For example, searching is a process intensive task, hence more search processors may be required than parse processors. In FIG. 2, by war of example, there are provided Five parsing microcode machines 22 *a–e*, seven searching microcode machines 24 *a–g*, four resolution microcode machines 26 *a–d*, and six modification microcode machines 28 *a–f*. The processors at each stage are not tied to a specific port on the chip, rather then are dynamically and automatically allocated to incoming packets. It is thus evident that the superscalarity of the architecture according to the present invention provides the network processor with massive processing power.

The previous sections have outlined how the speed of packet processing is greatly increased using the system of the present invention, due to the customized microcode design and superscalar architecture. However, with such a high-speed system, the overall system performance would then be dependent on the memory access speed. In a preferred embodiment, all or in some applications, part of the requisite memory for the network processor of the present invention is embedded in the chip, in RAM 40. This provides superior performance that is unmatched by pure external memory architectures.

Moreover, it is the compactness of the microcode machines of the present invention that allows the RAM 40 to be embedded on the same chip within the network processor 100. In known network processors, embedding RAM in the network processing chip containing RISCs would reduce the number of RISCs and significantly compromise the computing power of the network processor.

It must be emphasized that the breakdown of packet processing into four basic tasks, and hence, into four types of microcode machines: parse search, resolves and modify, is a presently-preferred embodiment of the invention. However, other breakdowns and other customized design of microcode machines featuring streamlined data paths and tailored instruction sets may be conceived and realized by those skilled in the art, and fall within the broad scope of the present invention.

It must be further emphasized that while, as stated above, improvements in chip size and in information density may ultimately lead to packet-processing speeds exceeding 10–40 gigabit/second, the realization of such processing speeds, in the immediate future requires the utilization of custom-designed microcode machines, according to the present invention.

Hence, there is provided a high-speed system for processing a packet and routing the packet to the requisite packet destination port, the system comprising: (a) a memory block for storing tabulated entries, and (b) at least one microcode machine, interacting with the memory block and accessing the tabulated entries, for processing and routing the packet, wherein at least one of the microcode machines is a customized microcode machine.

In a preferred embodiment, the microcode machines are integrated in a superscalar architecture.

Exemplary features of the customized data paths of the various TCPs (task-customized processors) of the present invention are presented below:

The architecture of parsing sub-system 22 is customized for high-speed parsing of packets and the preparation of keys for the searching sub-system. The architecture typically includes:

A wide variety of CAMs for quickly matching well-known frame identifiers, e.g. BPDU, IP protocol, IP options, IP addresses and IP ports. ASCII identifiers can also be quickly matched, e.g. HTTP "GET" and "POST", RTSP "Cseq", etc.

A parallel text-scanning engine or identifying delimiters and tokens in text strings.

A flexible internal data-path enables single clock data moves from bit/byte offsets of one register to other bit/byte offsets in another register. This allows the building of compound search keys from different fields within a frame.

An ASCII to binary converter engine, converting up to five ASCII characters to the respective decimal and hexadecimal value, useful in a wide variety of applications, e.g. NAT.

Checksum engine to verify IP header checksum.

Searching sub-system 24 supports various types of data structures, including hash tables, radix trees, CAMs and tables. These data structure types are used to build the lookup tables and policy rules used for the packet handling and decision-making process.

A separate data structure, table or tree, is used to store information pertaining to a specific layer or task. For example, a hash table for MAC addresses can be used for layer 2 forwarding, a second table for local IP addresses, a third table for IP sessions (i.e. destination IP addresses, source IP addresses and associated port numbers). etc. Similarly, separate trees can be defined for storing different data types, e.g. IP routes table and URL table.

Searching sub-system 24 enables conditional search operations that may be applied in various applications. Search results in one data structure can trigger search in another data structure, for example, when searching for an IP encapsulation. The results of the search for the first IP address determines in which data structure the search for the second IP address will be conducted.

Custom tables are available to search according to any criteria for effective groupings and generalization of conditions. Special support is provided to enable wire speed performance of Layer 5–7 processing such as text strings, which are often very long and of varying lengths (e.g. URLs).

To enable these unprecedented search capabilities, the searching sub-system uses a variety of search algorithms, optimized for various searched objects and properties. These algorithms feature innovative enhancements to hash tables, trees and CAMs. Multiple searches using different search methods can be applied simultaneously to yield high wire speed throughput, even when applying highly complex network policies.

Resolution sub-system 26 has architecture customized for high-speed execution. The architecture typically features:

Parallel analysis and resolution of complex equations with many min-terms within a few commands.

Specific logic for supporting nested IF_ELSE_IF statements.

A flexible internal data path for single clock data moves from bit/byte offsets of one register to other bit/byte offsets in another register. This allows building compound search keys from different fields within a frame.

The architecture of modification sub-system 28 is customized for high packet throughput and execution. The architecture typically features:

Flexibility to modify any bit or byte within the entire frame in a single command. Up to 64 bytes may be overwritten, inserted or modified in the packet. The order of the modified fields is flexible, and the modification sub-system can 'slide' forward and backwards along the frame to modify the desired fields.

Efficient modification of multicast packets. For example, a multicast that is to be transmitted to several VLANs via the destination output port, can be transmitted only once across the system's switching fabric. It is then modified at the egress side individually to match the appropriate destination VLAN.

A flexible internal data path enables single clock data moves from bit/byte offsets of one register to other bit/byte offsets in another register.

Hardware engines designed to compute new checksums, when needed.

Modification sub-system 28 modifies packet contents in accordance with the results of the previous stages. It modifies relevant fields. e.g., VLAN assignments, Network Address Translation (NAT), and QoS priority setting.

Operation of all the above-described TCP processors is controlled by a set of software commands, downloaded from the system's host processor. Any change in network policy, e.g. user access, application priority, URL, switching criteria, is deployed simply by downloading updated code to the chip. This programmability offers the flexibility to adjust to new intranet and Internet applications through simple changes in software without necessitating changes to system hardware.

EXAMPLES

Reference is now made to the following examples, which together with the above descriptions, illustrate the invention in a non limiting fashion.

The following examples compare the typical number of clock cycles (where each instruction takes a clock cycle) required for the identical packet-processing task using the system of the present invention and a general RISC processor of the prior art. Each example clearly demonstrates the superior speed and performance of task-customized processors.

Example 1

Parsing a Packet

Table 1 provides a comparison of packet processing tasks performed with TOPcore technology versus a general RISC processor of the prior art.

TABLE 1

| Example No. | Packet Processing Task | Clock Cycles TCP (Invention) | Clock Cycles RISC (Prior Art) |
| --- | --- | --- | --- |
| 1 | Parsing a URL in an HTTP/RTSP packet | 60 | 400 |
| 2 | Searching URL tables | 6 | 200 |
| 3 | Resolving a multicast routing decision | 8 | 80 |

For Example No. 1, Table 1 lists the number of clock cycles that are required to parse a typical HTTP (Hyper Text Transport Protocol) or RTSP (Real Time Transport Protocol) packet and determine the URL. Using the parser of the present invention, it takes 60 clock cycles, as compared to 400 instructions with a RISC processor (for a URL of 32 characters).

Example 2

Searching URL Tables

Table 1 provides the number of clock cycles that are required to lookup the URL in a typical HTTP or RTSP packet in the URL tables. Using the search sub-system of the present invention, up to 6 clock cycles are required, regardless of the length of the URL, as compared to 200 clock cycles using a RISC processor of the prior art.

Example 3

Resolving a Multicast Rotating Decision

Table 1 lists the number of clock cycles that are required to resolve a multicast routing decision based on PIM-SM (Protocol Independent Multicast-Sparse Mode). This type of packet is frequently used for sending multi-client frames across the Internet, such as Voice over IP (VOIP) and videoconferencing. Using the search sub-system of the present invention, no more than 8 clock cycles are required, as compared to 80 clock cycles with a RISC processor of the prior art.

Although the invention has been described in conjunction with specific embodiments thereof, it is evident that many alternatives, modifications and variations will be apparent to those skilled in the art. Accordingly, it is intended to embrace all such alternatives modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A high-speed system for processing a packet and routing the packet to a requisite packet destination port, the system comprising:
a single chip having:
   (a) a memory block, embedded within said single chip, for storing tabulated entries, and
   (b) a plurality of microcode machines, disposed within said single chip, interacting with said memory block, accessing said tabulated entries, processing the packet, and routing the packet,
wherein said plurality of microcode machines include a hardware-customized microcode machine.

2. The system of claim 1, said hardware-customized microcode machine being designed to achieve a specific well-defined task.

3. The system of claim 2, wherein said hardware-customized microcode machine is a CISC processor.

4. The system of claim 2, wherein said plurality of microcode machines includes a plurality of hardware-customized microcode machines.

5. The system of claim 4, wherein each of said hardware-customized microcode machines is designed for performing a different, specific, well-defined task.

6. The system of claim 4, wherein said plurality of hardware-customized microcode machines is designed for performing a parsing function and a searching function, and wherein at least one hardware-customized microcode machine of said plurality is designed for performing a single function of said functions.

7. The system of claim 6, wherein said single function is said parsing function.

8. The system of claim 6, wherein said single function is said searching function.

9. The system of claim 4, wherein said plurality of hardware-customized microcode machines is designed for performing a resolution function in which a destination port of the packet is resolved.

10. The system of claim 4, wherein said plurality of hardware-customized microcode machines is designed for performing a modification function in which the packet is modified.

11. The system of claim 4, wherein said plurality of hardware-customized microcode machines is designed for performing at least two functions selected from the group consisting of: a parsing function, a searching function, a resolution function in which a destination port of the packet is resolved, and a modification function in which the packet is modified, and wherein at least one hardware-customized microcode machine of said plurality is designed for performing a single function of said functions.

12. The system of claim 11, wherein said single function of said functions is said parsing function.

13. The system of claim 11, wherein said single function of said functions is said searching function.

14. The system of claim of 11, wherein said single function of said functions is said resolution function.

15. The system of claim 11, wherein said single function of said functions is said modification function.

16. The system of claim 4, wherein said plurality of hardware-customized microcode machines is configured for super-scalar architecture.

17. The system of claim 1, wherein said hardware-customized microcode machine has a customized instruction set.

18. The system of claim 4, wherein said plurality of hardware-customized microcode machines have a customized data path.

19. A high-speed system for processing a packet and routing the packet to the requisite packet destination port, the system comprising:

(a) a memory block for storing tabulated entries, and (b) a plurality of microcode machines, for interacting with said memory block, accessing said tabulated entries, processing the packet, and routing the packet, wherein at least one of said plurality of microcode machines is a hardware-customized microcode machine, and wherein said plurality of microcode machines is designed for performing at least two functions selected from the group consisting of: a parsing function, a searching function, a resolution function in which a destination port of the packet is resolved, and a modification function in which the packet is modified, and wherein at least said hardware-customized microcode machine is designed for performing a single function of said functions.

20. The system of claim 19, wherein said single function of said functions is said parsing function.

21. The system of claim 19, wherein said single function of said functions is said searching function.

22. The system of claim 19, wherein said single function of said functions is said resolution function.

23. The system of claims 19, wherein said single function of said functions is said modification function.

24. The system of claim 19, wherein said plurality of microcode machines is a plurality of hardware-customized microcode machines.

25. The system of claim of 24, wherein said plurality of hardware-customized microcode machines is configured for super-scalar architecture.

26. The system of claim 24, wherein said plurality of hardware-customized microcode machines is disposed in a single chip.

27. The system of claim 26, wherein each of said hardware-customized microcode machines is designed for performing a different, specific, well-defined task.

* * * * *